Aug. 2, 1932.  P. W. DIETMANN  1,870,201
APPARATUS FOR ARRANGING BOXES
Filed March 26, 1930  2 Sheets-Sheet 1
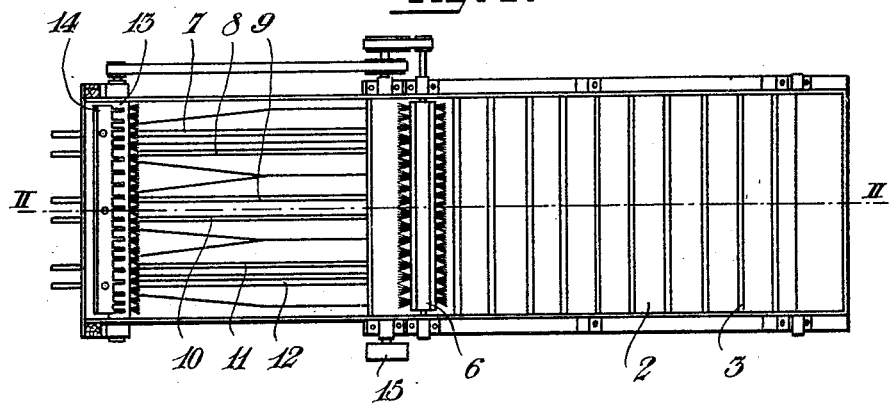
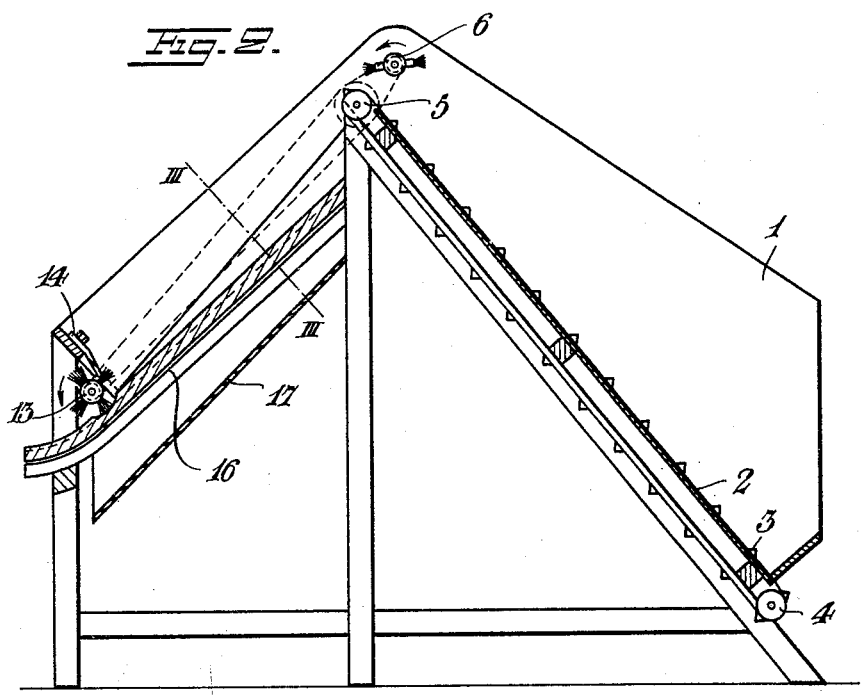

Aug. 2, 1932.  P. W. DIETMANN  1,870,201
APPARATUS FOR ARRANGING BOXES
Filed March 26, 1930   2 Sheets-Sheet 2
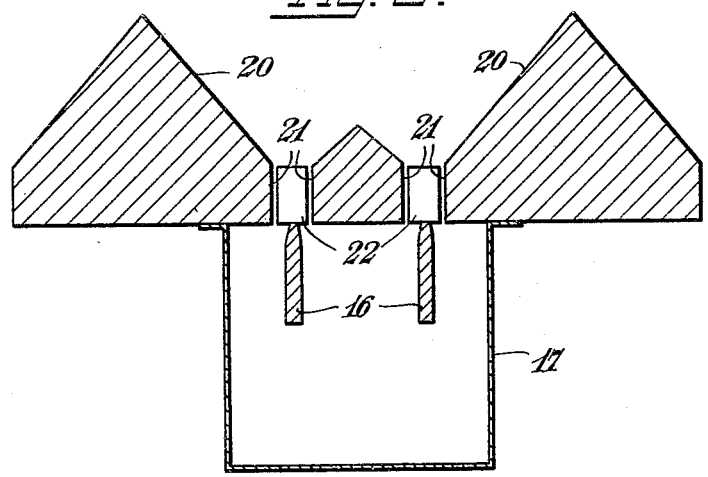
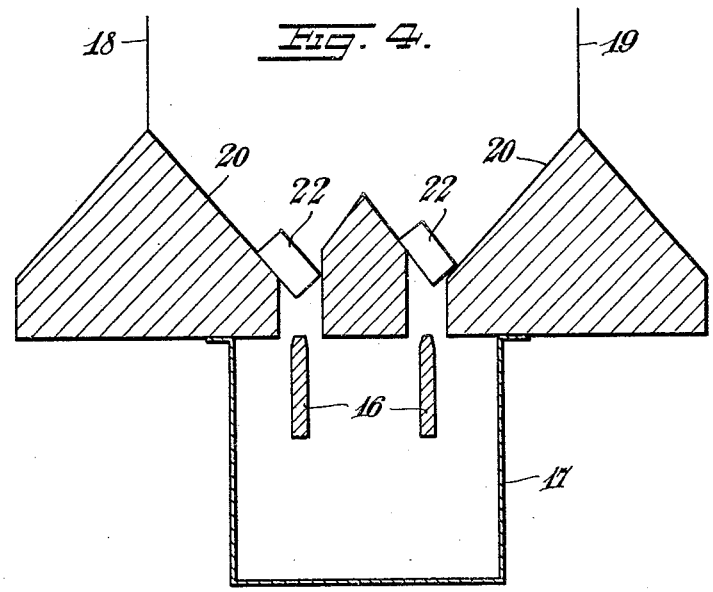

Patented Aug. 2, 1932

1,870,201

UNITED STATES PATENT OFFICE

PAUL WILHELM DIETMANN, OF JONKOPING, SWEDEN

APPARATUS FOR ARRANGING BOXES

Application filed March 26, 1930, Serial No. 439,151, and in Sweden June 21, 1929.

The present invention relates to such manufacture of goods packed in boxes, especially matches, in which the boxes, according as they are manufactured, are collected in a state of disorder in a receptacle to be then put in order in any convenient manner and supplied to machines for filling, shutting up, labelling or the like. As a rule, this arranging of the boxes, usually in a string one behind the other, has hitherto been effected manually and, as a result, the operation has been a rather expensive one.

This invention has for its object to provide a method of and means for effecting an automatic arranging of boxes in a string one behind the other so that the boxes, if desired after an additional turning to a predetermined position, may be supplied to machines for further operation. The method according to the invention consists, substantially, in first placing the boxes, while still in disordered state, upon an inclined support to cause them to turn over and allow them to slide down into a chute or the like to be collected therein in a string one behind the other.

One embodiment of a device for carrying the method according to this invention into effect is illustrated in the accompanying drawings in which, Fig. 1 is a top plan view of a mechanism for arranging boxes in a string one behind the other. Fig. 2 is a vertical cross section on the line II—II in Fig. 1. Fig. 3 shows part of a cross section on the line III—III in Fig. 2 to an enlarged scale and, Fig. 4 shows a similar section of a modification.

With reference to Figs. 1 and 2, the numeral 1 indicates a receptacle to receive boxes supplied to the receptacle in a state of disorder. 2 is an endless conveyor belt the upper part of which constitutes an upwardly moving inclined side wall or bottom of said receptacle. The belt conveyor 2 is guided by a lower roller 4 and an upper roller 5. Provided at a distance above the upper roller 5 is a rotary brush 6. In order to receive the boxes dropping from the conveyor belt at the upper roller 5 an inclined table is provided comprising in the example shown six receiving channels 7 to 12 and associated guiding walls inclined towards the respective channels to guide the boxes thereinto. Provided at the lower end of said inclined table are a rotary brush 13 and a comb 14 with which said brush cooperates for a purpose hereinafter set forth. By means of a belt pulley 15 driving power is transmitted to the roller 5 from which power is in turn derived to drive the brushes 6 and 13.

In Fig. 3 two channels with the associated guiding walls are shown, the latter being indicated by the reference numeral 20. The channels are here shown as formed with parallel sides 21 of the same height as the boxes 22 and of a width somewhat greater than that of the boxes when the latter are in the desired position in the channel, as in case of match boxes resting upon one of their longer sides, as shown in the drawing. The boxes, when in this position, are only supported in the centre of the channel by supporting bars 16. Provided below the channels is a larger channel or chute 17.

While, as shown in Fig. 3, both side walls of the channels are of the same height, it may be noted that one side wall of the channel may be higher than the other, as shown in Fig. 4, which often may be more advantageous. Fig. 4 also shows a pair of boxes 22 which are going to drop into the channels.

The operation of the device described is as follows: The receptacle 1 is filled with boxes which in case of match boxes may be supplied from the box machines or the drying chambers. By means of the belt 2 said boxes are lifted up to the upper roller 5. Here the boxes are acted on by the rotary brush 6 which only allows a layer of boxes of such a thickness to pass as may be readily arranged in the machine, while throwing the surplus of boxes back again down into the receptacle. In order to permit adjustment of the rate of feeding the bearings of the brush may, preferably, be made adjustable up and down. After having passed over the roller 5 the boxes will drop in scattered order upon the inclined table and in striking the surfaces 20 inclined towards the channels the boxes are caused to turn over so that their centre of gravity will assume a low position. In this turning over the shells will come to lie upon one of their wider sides, whereas drawers as well as similar boxes provided with bottoms will come to lie with their bottom directed either downwards or upwards. The boxes will then slide along said inclined surfaces until striking the uppermost portion of one side surface of the respective channel, whereby the boxes will be caused due to their inertia to turn in such a way that, as a rule, the longer edge lines of the boxes will be parallel to the channel.

The boxes will now drop into the channel so as to come to rest with one of their narrower longer sides upon the supporting bars 16. Of course, one box or the other may come to stand upon one of its shorter sides, such boxes, however, will be engaged by the rotary brush 13 and brought to the position desired. Assuming, further, that boxes would place themselves upon each other in the channel, the overlying boxes will be thrown upwards by the brush 13 until they will drop into the channel. The comb 14 prevents the boxes thus thrown upwards from being thrown out of the channel.

Chips and other waste products accompanying the boxes will drop through the spaces between the supporting bars 16 and the side walls of the respective channel down into the chute 17.

In the example illustrated in the drawings the channels form an angle with the horizontal plane which corresponds substantially to the angle of friction of the boxes contained in the channels which will, as a result, slide down due to their own weight. The channels, however, may also be arranged more or less horizontal thereby reducing the height of the machine. In such case the channels may, preferably, be provided with a shaking mechanism to facilitate the dropping of the boxes into the channels as well as the feeding of the boxes therethrough. It is yet more simple to provide an endless conveyor belt only moving along the bottom of the channel.

While in the device shown in Fig. 1. six channels are provided side by side it may be noted that the number of channels may, of course, vary from a single channel up to any desired plurality. As the boxes usually comprise an upper part and a lower part or an inner box or drawer and an outer box or shell both types of boxes may be arranged simultaneously in separate channels. In such case the box receptacle may be provided with some suitable partition wall, partition walls being also inserted between the channels, as shown at 18 and 19 in Fig. 4. The boxes adapted to be arranged in the machine may be of varying shape, as square-shaped, cylindrical or oval and may be made from various materials, as cardboard, wood or sheet-metal.

What I claim is:

1. In a device for arranging boxes, as match boxes, into a predetermined order for subsequent operation, box-receiving channels of a width somewhat greater than that of the boxes when in their desired position, the two side walls of each such channel being of different height, an inclined guiding wall along the upper edge of at least one of the side walls of each channel and of a width, substantially greater than the length of the boxes, and means to automatically supply boxes onto said guiding walls.

2. In a device for arranging boxes, as match boxes, into a predetermined order for subsequent operation, an automatically travelling endless conveyor belt carrying the boxes to be arranged, means for regulating the number of boxes delivered from said belt, inclined guiding walls of a width substantially greater than the length of the boxes beneath the conveyor belt to receive the boxes dropping from said belt, an open-bottomed box-receiving channel along the foot of each guiding wall, and means to support the boxes in said channels while leaving free openings at the bottom thereof.

3. In a device for arranging boxes, as match boxes, into a predetermined order for subsequent operation, an automatically travelling endless conveyor belt carrying the boxes to be arranged, a rotary brush above said belt, means for adjusting the space between said brush and said belt, inclined guiding walls of a width substantially greater than the length of the boxes beneath the conveyor belt to receive the boxes dropping from said belt, an open-bottomed box-receiving channel along the foot of each guiding wall, and means to support the boxes in said channels while leaving free openings at the bottom thereof.

PAUL WILHELM DIETMANN.